United States Patent [19]

Bauer et al.

[11] 4,418,420
[45] Nov. 29, 1983

[54] METHOD AND ARRANGEMENT FOR GRIPPING X-RAY FILM

[75] Inventors: Walter Bauer; Heinrich Färber, both of Munich; Reimund Kluge, Unterhaching, all of Fed. Rep. of Germany

[73] Assignee: AGFA-Gevaert Aktiengesellschaft, Leverkusen, Fed. Rep. of Germany

[21] Appl. No.: 290,930

[22] Filed: Aug. 7, 1981

[30] Foreign Application Priority Data

Aug. 9, 1980 [DE] Fed. Rep. of Germany ....... 3030201

[51] Int. Cl.³ .............................................. G03B 41/16
[52] U.S. Cl. ..................................... 378/187; 378/171
[58] Field of Search ................. 378/187, 171; 206/455

[56] References Cited

U.S. PATENT DOCUMENTS 2,590,891 4/1952 Reuter ................................ 378/187

FOREIGN PATENT DOCUMENTS 2802730 7/1979 Fed. Rep. of Germany .
2912669 10/1980 Fed. Rep. of Germany .

*Primary Examiner*—Alfred E. Smith
*Assistant Examiner*—T. N. Grigsby
*Attorney, Agent, or Firm*—Kontler, Grimes & Battersby

[57] ABSTRACT

X-ray film in a cassette or camera is magnetically gripped by a pair of magnetic units which engage opposite sides of the film. Each of the units includes a sheet of magnetic material and an intensifying screen located on that side of the associated magnetic sheet which faces the other unit. The units have cooperating first portions which engage a first region of the film and cooperating second portions which engage a second region of the film. The units are designed in such a manner that the magnetic force of the second portions exceeds that of the first portions so that the second region of the film is gripped more strongly than its first region. Furthermore, the units are arranged such that the second portions thereof engage the film no later than the first portions thereof. In this manner, entrapment of air bubbles on the surface of the film is prevented and image quality is improved.

31 Claims, 10 Drawing Figures

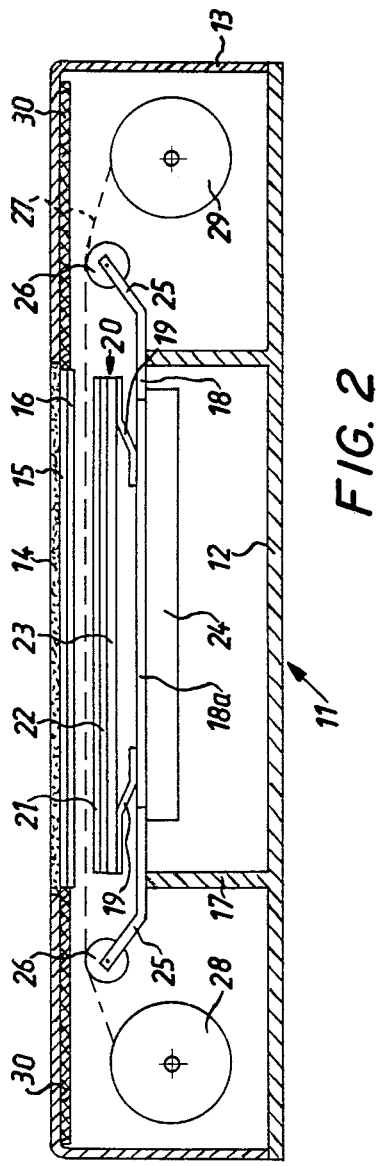
FIG. 2
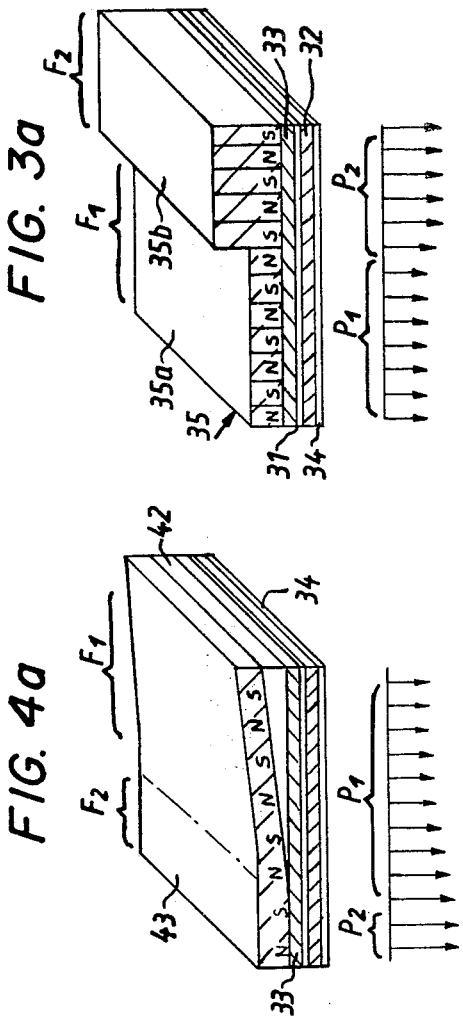
FIG. 3a
FIG. 4a

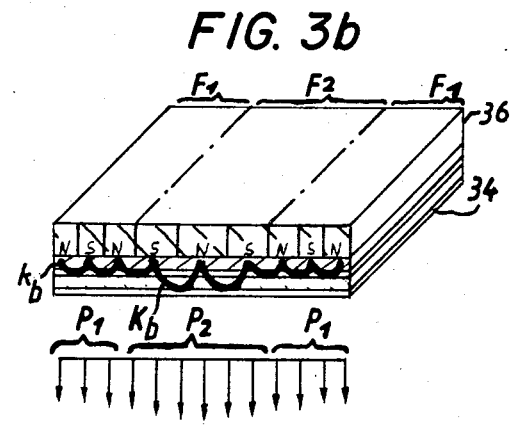
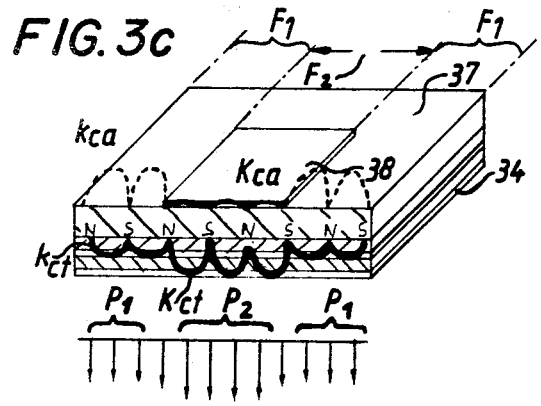
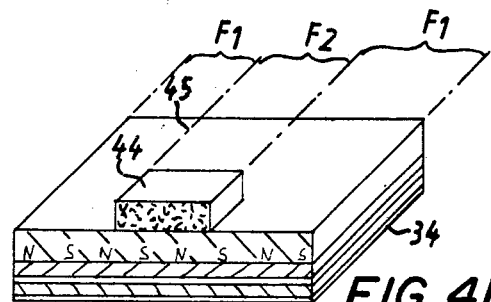
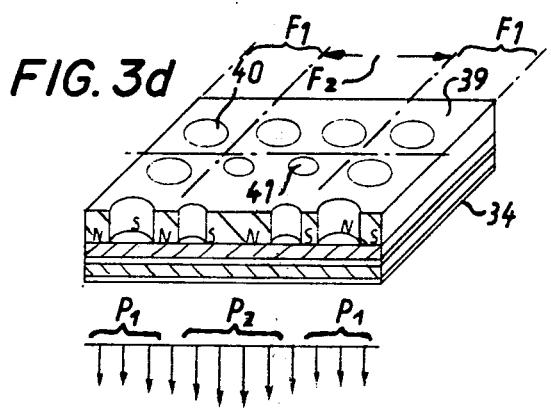
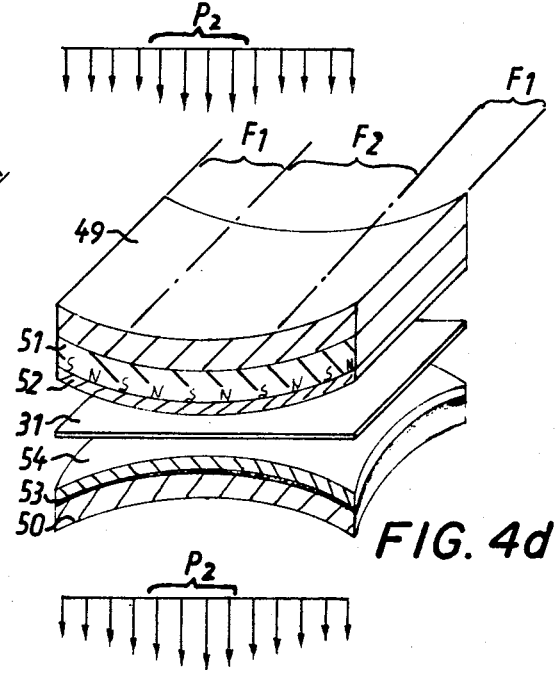
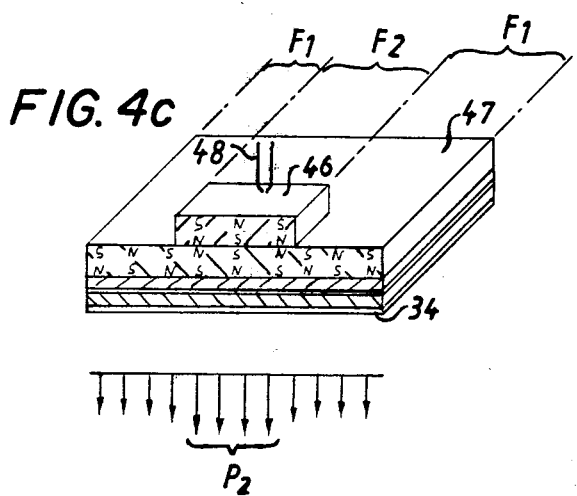

METHOD AND ARRANGEMENT FOR GRIPPING X-RAY FILM

BACKGROUND OF THE INVENTION

The invention relates generally to the handling of photosensitive materials.

More particularly, the invention relates to a method and arrangement for gripping X-ray film.

A known arrangement for gripping X-ray film in a cassette or camera includes a pair of magnetic units which grip opposite sides of the film. Each of the magnetic units consists of a magnetic sheet and an intensifying screen located on that side of the associated magnetic sheet facing away from the other unit. The dimensions of the magnetic sheets and intensifying screens approximate those of the area of the film to be exposed. At least one of the magnetic sheets is flexible.

The German publication DE-OS 28 02 730.7 discloses a gripping arrangement of the above type in a cassette. A similar gripping arrangement in a camera is described in the German publication DE-OS 29 12 669.0.

It has been found that the use of a magnetic gripping arrangement such as outlined above frequently results in the formation of air bubbles. This causes the intensifying screens and the film to contact one another non-uniformly which adversely affects the quality of the image in that there is a lack of definition. In those cases, as in cameras, where the magnetic units are maintained essentially parallel to one another as they are brought into engagement with the film, it is quite possible for the edges to contact the film before all of the air has escaped from the central region. Air bubbles have also been found in cassettes of the type having a hinged connection between the top and bottom portions thereof, especially large cassettes. The air bubbles in this case stem from the fact that the cassettes are generally closed very rapidly so that the air does not have time to escape completely.

OBJECTS AND SUMMARY OF THE INVENTION

It is an object of the invention to provide a method and arrangement for gripping X-ray film which enable air bubble formation to be reduced.

Another object of the invention is to provide a method and arrangement for gripping X-ray film which enable image quality to be improved.

An additional object of the invention is to provide a gripping arrangement of the type described above which is improved in that the formation of air bubbles during gripping of the film may be largely avoided and any air bubbles present may be eliminated.

The preceding objects, and other which will become apparent as the description proceeds, are achieved by the invention.

According to the invention, a method of gripping X-ray film comprises magnetically engaging one region of the film with a greater force than another region of the film.

In a preferred embodiment of the method, the more firmly gripped region of the film is engaged no later than the less firmly gripped region thereof.

An arrangement in accordance with the invention for gripping X-ray film includes a pair of relatively movable units for engaging opposite sides of the film. Each of the units has a magnetic element for attracting the other unit. The units have cooperating first portions arranged to engage the film with a first magnetic force of first magnitude and cooperating second portions arranged to engage the film with a second magnetic force of second and larger magnitude.

A preferred embodiment of the arrangement provides for the magnetic gripping units to be arranged such that the second portions thereof which grip the film more firmly engage the film no later than the first portions which grip the film less firmly.

It is further preferred for at least one of the magnetic gripping units to be flexible.

The invention provides a region of maximum attractive force between the magnetic gripping units. This creates a force gradient along which the magnetic gripping units may approach one another gradually. Air bubbles may then be avoided completely or, if air bubbles are formed as the magnetic gripping units approach one another, such air bubbles may be continuously pushed outwards by the variable attractive force. The magnetic gripping units may approach one another beginning at one side thereof and proceeding in a single direction from this side or beginning at a central region thereof and proceeding outwards from this region in all directions.

The novel features which are considered as characteristic of the invention are set forth in particular in the appended claims. The improved arrangement itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a cross-section through a camera having a gripping arrangement according to the invention;

FIGS. 3a–3d are perspective views of different embodiments of a gripping arrangement of the invention; and FIGS. 4a–4d are perspective views of additional embodiments of a gripping arrangement in accordance with the invention.

DESCRIPTION OF THE PREFERRED EMBODIMENTS

Figure 1:
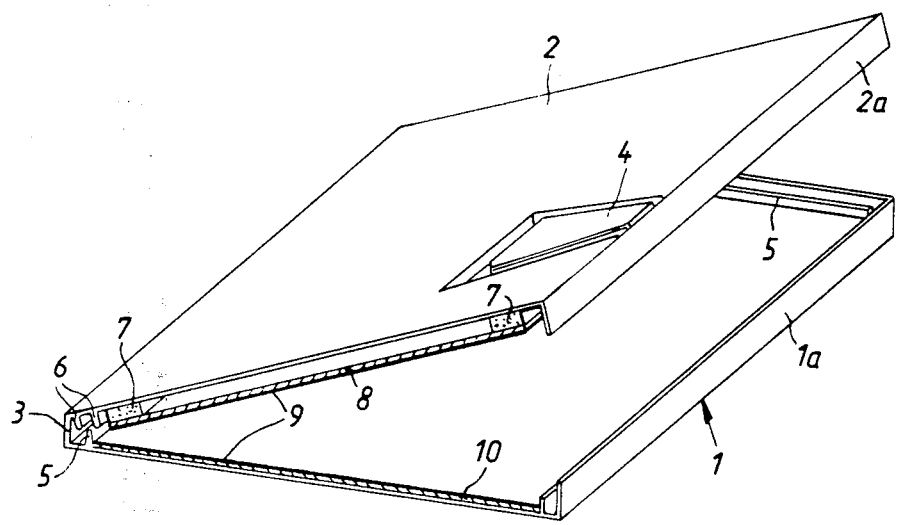
FIG. 1 is a sectional perspective view of a cassette having a gripping arrangement in accordance with the invention.

The gripping arrangement of the invention is useful in various devices. Two examples of such devices are cassettes and cameras for X-ray film which will be briefly described below.

FIG. 1 illustrates a cassette for X-ray film having a base 1 and a cover 2. The base 1 and cover 2 are connected with one another by means of a hinge 3. The cover 2 has an inset handle 4 which operates non-illustrated locking mechanisms.

It is pointed out that the hinge 3 may be eliminated, that is, the base 1 and cover 2 need not be permanently connected. In such a case, the cover 2 is placed over the base 1 in an inverted position when the cassette is to be closed and the cover 2 and base 1 are locked together via locking mechanisms provided on at least two sides of the cassette. Of course, other modes of connecting the base 1 and cover 2 with one another may be used.

The base 1 has lips 5 which extend along the edges thereof and define a rectangle inside the base 1. The rectangle receives a non-illustrated sheet of X-ray film and has dimensions corresponding to those of the film. Two parallel lips 6 are arranged at the hinge side of the cover 2 and embrace the lip 5 running along the hinge side of the base 1 when the cassette is closed.

The base 1 has ledges 1a along all but the hinge side thereof and the ledges 1a define grooves with the corresponding lips 5 of the base 1. Similarly, the cover 2 has ledges 2a along all but the hinge side thereof and the ledges 2a are received in the grooves of the base 1 when the cassete is closed. The lips 6 and ledges 2a seal the cassette against light.

A foam border 7 is provided on the inner side of the cover 2 and carries a magnetized sheet or plate 8. The magnetized sheet 8, which may be rigid or flexible, is a permanent magnet and may, for example, be composed of the following substances: (1) an Alnico alloy; (2) an oxidic permanent magnet material (Fe-Co oxides; Ba and Br ferrites); (3) polyvinylchloride foils coated with a magnetic material; and (4) materials produced by injection molding oxide powders (ceramic substances such as iron oxide and barium oxide) and a binding agent.

A magnetizable foil or sheet 10 is secured to the base 1, e.g., adhesively. The magnetizable foil 10 is a non-permanent magnet, that is, a magnet of the type which generates no magnetic field of its own but has an induced magnetic field when exposed to the magnetic field of another magnet. The magnetizable foil 10 may contain any magnetizable material taking into account that the absorption of X-rays by the magnetizable foil 10 should be held to a minimum. The magnetizable foil 10 may, for instance, be in the form of any of the following: (1) a very thin steel foil; (2) cardboard adhesively coated with iron; and (3) plastic containing a ferrite powder or the like.

Intensifying screens 9 are arranged over those surfaces of the magnetized sheet 8 and magnetizable foil 10 which face one another. The intensifying screens 9 may be loose and inserted into the cassette together with the film. However, in order to simplify handling of the cassette, it is advantageous for the intensifying screens 9 to be loosely connected with the magnetized sheet 8 and magnetizable foil 10, respectively. This makes it necessary to insert only a sheet of film into the open cassette. Once a sheet of film has been placed inside the cassette and the latter has been closed, one of the intensifying screens 9 is located on either side of the film. The intensifying screens 9 are pressed together inside the closed cassette due to the sandwich arrangement of the magnetized sheet 8 and the magnetizable foil 10. A predetermined minimum pressure, which is a primary criterion for good image quality, is exerted over the entire surface of the film as a result of the magnetic field between the magnetized sheet 8 and the magnetizable foil 10. If the magnetized sheet 8 is flexible rather than rigid, the gripping pressure is improved. When the cassette is opened, the magnetized sheet 8 and its intensifying screen 9 are lifted away from the magnetizable foil 10 by the cover 2.

The dimensions of the magnetized sheet 8, the magnetizable foil 10 and the intensifying screens 9 approximate those of the film.

Instead of securing the magnetized sheet 8 directly to the foam border 7, it is possible to encase the magnetized sheet 8 in a thin sheath which is then connected to foam ledges provided on the cover 2. It is also possible to integrate the magnetized sheet 8 directly into the cover 2.

An X-ray camera such as illustrated in FIG. 2 may, for example, include a picture tube 11 having a frame 12 and a housing 13. The upper surface of the housing 13 is formed with a window 14 consisting of a material, e.g., cardboard or fiberboard, which is impermeable to light and has a low X-ray absorption coefficient. A magnetizable steel foil or sheet 15 constituting a non-permanent magnet is mounted adjacent the window 14 inside the picture tube 11. An intensifying screen 16 is fastened to the magnetizable steel foil 15.

The frame 12 has ledges 17 which support a carrier plate 18. Leaf springs 19 are arranged on that surface of the carrier plate 18 facing the window 14 and support a pressure-exerting unit 20. The pressure-exerting unit 20 includes an intensifying screen 21, which faces the intensifying screen 16, as well as a multipolar magnetized sheet or plate 22 and an iron sheet or plate 23. The magnetized sheet 22 is a permanent magnet. The iron sheet 23 sits directly on the leaf springs 19 and the magnetized sheet 22 is confined between the iron plate 23 and the intensifying screen 21. An electromagnet 24 is arranged on the lower surface of the carrier plate 18 and the latter is provided with an opening 18a at the central region of the electromagnet 24.

A supply reel 28 for a roll of X-ray film 27 is arranged on one side of the picture tube 11 while a take-up reel 29 for the film 27 is located on the other side of the picture tube 11. The take-up reel 29 is connected with a non-illustrated drive mechanism. The carrier plate 18 has a supporting arm 25 on either side of the pressure-exerting unit 20 and the supporting arms 25 each support a guide roll 26 for the film 27. The widths of the guide rolls 26 correspond to the width of the film 27.

Lead sheets or plates 30 for the absorption of scattered radiation are mounted inside the housing 13 on the sides of the window 14.

The dimensions or areas of the magnetizable steel foil 15, the magnetized sheet 22, the iron sheet 23 and the intensifying screens 16 and 21 approximate the dimensions or area of the window 14, that is, the dimensions or area of that portion of the film 27 which is to be exposed at any time.

In operation, current is supplied to the electromagnet 24. The magnetic field of the electromagnet 24 acts on the iron sheet 23 thereby attracting the latter to the electromagnet 24. The pressure-exerting unit 20, of which the iron sheet 23 is a part, now moves towards the electromagnet 24 against the resistance of the leaf springs 19 and the attractive force between the magnetized sheet 22 and the magnetizable steel foil 15. The pressure-exerting unit 20 is displaced to the position illustrated in FIG. 2. The film 27 is thereupon fed from the supply reel 28 to the take-up reel 29 via the gap created between the intensifying screens 16 and 21 by the action of the electromagnet 24. Once the desired length of the film 27 has been unreeled from the supply reel 28, the supply of current to the electromagnet 24 is discontinued. The pressure-exerting unit 20 now moves towards the window 14 due to the force of the leaf springs 19. When the pressure-exerting unit 20 draws sufficiently near the magnetizable steel foil 15, the magnetic field of the multipolar magnetized sheet 22 interacts with the magnetizable steel foil 15 thereby causing the pressure-exerting unit 20 to advance further towards the window 14. The advance of the pressure-exerting unit 20 eventually results in the application of a predetermined minimum pressure to the intensifying screen 16 of the magnetizable steel foil 15 by the intensifying screen 21 of the pressure-exerting unit 20.

It is understood that a permanently magnetized sheet or plate, rather than the non-permanently magnetized steel foil 15, may be mounted adjacent the window 14. In such a case, the magnetized sheet 22 of the pressure-exerting unit 20 may be eliminated under certain circumstances.

In accordance with the invention, the magnetized sheet exerts forces of different magnitudes on different portions of the magnetizable foil. On the one hand, this may be achieved by causing a variable magnetic force to be generated by the magnetized sheet directly. On the other hand, mechanical and/or pneumatic means may be provided for displacing localized portions of a magnetic sheet having a uniform magnetic field to thereby create localized regions which exert a magnetic field of increased strength. Examples of magnetized sheets which generate a variable magnetic force are shown in FIGS. 3a–3d while examples of the use of mechanical and/or pneumatic means to create localized regions of increased field strength are illustrated in FIGS. 4a–4d.

FIG. 3a shows a sheet of film 31 which is located between a pair of intensifying screens 32 and 33. A magnetizable sheet 34, which corresponds to the magnetizable foil 10 of FIG. 1 and the magnetizable foil 15 of FIG. 2, is arranged on the surface of the intensifying screen 32 which faces away from the film 31.

A magnetized sheet 35 is arranged on that surface of the intensifying screen 33 which faces away from the film 31. The magnetized sheet 35 corresponds to the magnetized sheet 8 of FIG. 1 and the magnetized sheet 22 of FIG. 2. The magnetized sheet 35 is arranged to exert magnetic forces of different magnitudes in each of two regions thereof. To this end, the magnetized sheet 35 is divided into two portions 35a and 35b which respectively correspond to areas $F_1$ and $F_2$ of the magnetized sheet 35. The portion 35a of the magnetized sheet 35 is thinner than the portion 35b and thus acts on the magnetizable sheet 34 with an attractive magnetic force $P_1$ which is smaller than the attractive magnetic force $P_2$ exerted on the magnetizable sheet 34 by the portion 35b.

Different magnetic forces as in FIG. 3a may also be achieved for a magnetized sheet of uniform thickness by magnetizing one portion of the magnetized sheet more strongly than the other portion or portions of the sheet during production thereof.

FIG. 3b illustrates a magnetized sheet 36 having a magnetic structure which must likewise be developed during manufacture. In this case, different magnetic forces in the areas $F_1$ and $F_2$ are obtained by having magnetic domains or poles of different sizes in the areas $F_1$ and $F_2$. Thus, the magnetic domains in the area $F_2$ are larger than those in the areas $F_1$. As a result, the primary magnetic lines of force $K_b$ for the large magnetic domains of the area $F_2$ extend through a larger arc than the primary magnetic lines of force $k_b$ for the small magnetic domains of the areas $F_1$. Consequently, for the same distance of separation between the magnetizable sheet 34 and the magnetized sheet 36, the primary magnetic lines of force $K_b$ for the large magnetic domains of the area $F_2$ penetrate the magnetizable sheet 34 whereas the primary magnetic lines of force $k_b$ for the small magnetic domains of the areas $F_1$ do not. Only the outermost secondary magnetic lines of force for the small magnetic domains reach the magnetizable sheet 34.

FIG. 3c shows a conventional, uniformly magnetized sheet 37. Here, an increased magnetic force $P_2$ in the area $F_2$ is achieved by placing a metal plate or cover 38 on the magnetized sheet 37 in the area $F_2$. The metal plate 38, which may be composed of a ferrite, is situated on that surface of the magnetized sheet 37 which faces away from the magnetizable sheet 34. The metal plate 38 blocks those magnetic lines of force $K_{ca}$ for the area $F_2$ which travel away from the magnetizable sheet 34 thereby strengthening the magnetic lines of force $K_{ct}$ for the area $F_2$ which travel towards the magnetizable sheet 34. The magnetic lines of force $k_{ca}$ for the areas $F_1$ remain free to travel away from the magnetizable sheet 34 so that the magnetic lines of force $k_{ct}$ for the areas $F_1$ which travel towards the magnetizable sheet 34 are not enhanced.

FIG. 3d again illustrates a conventional, uniformly magnetized sheet 39. In this case, different magnetic field strengths in the areas $F_1$ and $F_2$ are achieved by providing openings 40 and 41 of different sizes in the magnetized sheet 39. The large openings 40 are located in the areas $F_1$ and, if desired, in portions of the area $F_2$. The small openings 41, on the other hand, are situated only in the area $F_2$. Since the areas $F_1$ contain only the large openings 40 while the area $F_2$ contains the small openings 41, the magnetic force $P_1$ of the areas $F_1$ is reduced as compared to the magnetic force $P_2$ of the area $F_2$. The same effect may be obtained by providing openings in the areas $F_1$ only and leaving the area $F_2$ free of openings.

FIGS. 4a–4d illustrate how mechanical and pneumatic means may act upon the magnetized and/or magnetizable sheets to create magnetic force of different magnitudes.

In FIG. 4a, a wedge 42 is inserted below a conventional, uniformly magnetized sheet 43. By way of example, the wedge 42 is here shown as being situated between the intensifying screen 33 and the magnetized sheet 43. The wedge 42 causes a substantial portion of the magnetized sheet 43 to be lifted away from the intensifying screen 33. The remaining portion of the magnetized sheet 43, constituting a marginal strip thereof, is still in contact with the intensifying screen 33. This marginal strip corresponds to an area $F_2$ of the magnetized sheet 43 which exerts a greater magnetic force $P_2$ on the magnetizable sheet 34 than the raised area $F_1$ of the magnetized sheet 43. A force gradient exists in the area $F_1$ in the present case.

FIG. 4b shows an elastic pad or block 44, e.g., a foam pad or block, arranged on that side of a flexible, uniformly magnetized sheet 45 which faces away from the magnetizable sheet 34. The elastic pad 44 causes that portion of the magnetized sheet 45 located beneath it to be displaced towards the magnetizable sheet 34 when the device, e.g., a cassette or camera, in which the magnetized and magnetizable sheets 45 and 34 are located is closed. The portion of the magnetized sheet 45 located below the elastic pad 44 then exerts a greater magnetic force $P_2$ on the magnetizable sheet 34 than the remaining portions of the magnetized sheet 45. The magnetized and magnetizable sheets 45 and 34 are thus pressed together more firmly in the region corresponding to the area $F_2$ than in the regions corresponding to the areas $F_1$.

In FIG. 4c, a permanently magnetized block or sheet 46 is positioned on that side of a uniformly magnetized sheet 47 which faces away from the magnetizable sheet 34. The magnetized block 46 is arranged on the magnetized sheet 47 in such a manner that like poles confront one another. This results in a repulsive force between the magnetized block 46 and the magnetized sheet 47 which causes that portion of the latter located beneath the magnetized block 46 to be displaced towards the magnetizable sheet 34. Consequently, when the device containing the magnetized and magnetizable sheets 47 and 34 is closed, the portion of the magnetized sheet 47 below the magnetized block 46 attracts the magnetizable sheet 34 more strongly than the other portions of the magnetized sheet 47. Again, the region corresponding to the area $F_2$ is pressed together more tightly than the regions corresponding to the areas $F_1$.

As schematically illustrated in FIG. 4c, it is possible to displace a portion of the magnetized sheet 47 towards the magnetizable sheet 34 by directing a stream of pressurized gas, particularly air, from a nozzle 48 onto that side of the magnetized sheet 47 which faces away from the magnetizable sheet 34. A stream of pressurized gas to displace a portion of a magnetizable sheet may be used alone or in combination with mechanical displacement means.

FIG. 4d shows the interior of an arcuate cassette having a cylindrical cover or upper portion 49 and a spherical base or lower portion 50. A flexible, uniformly magnetized sheet 51 and intensifying screen 52 of cylindrical configuration are secured to the cover 49 of the cassette. Similarly, a magnetizable sheet 53 and intensifying screen 54 of spherical configuration are secured to the base 50 of the cassette. As the magnetized sheet 51 and the magnetizable sheet 53 approach one another in this arrangement, the central area $F_2$ of the magnetized sheet 51 exerts a force $P_2$ on the magnetizable sheet 53 which exceeds the force $P_1$ exerted by the marginal areas $F_1$. Thus, when the cassette is closed, the magnetized sheet 51 and magnetizable sheet 53 are pressed together more firmly in the region corresponding to the central area $F_2$ than in the regions corresponding to the marginal areas $F_1$.

It will be understood that the cover 49 could be spherical and the base 50 cylindrical. Similarly, the cover 49 and base 50 could both be cylindrical or could both be spherical.

In the preceding examples, the areas $F_2$ which exert a greater magnetic force $P_2$ correspond to either localized central portions of the magnetized sheet, that is, central portions which do not extend the length of the magnetized sheet, or to strip-like central portions of the magnetized sheet which extend the length of the latter, or to strip-like marginal portions of the magnetized sheet. In those cases, e.g., as in the camera of FIG. 2, where the magnetized and magnetizable sheets are parallel, or remain in the same relative orientation, as they approach one another, it is particularly advantageous to use the embodiments illustrated in FIGS. 3c, 3d, 4b, 4c and 4d. However, the embodiment of FIG. 3b is also well-suited for use in such cases. On the other hand, the embodiments of FIGS. 3a and 4a are best adapted for use in hinged cassettes as is the embodiment of FIG. 4d if the cover 49 and base 50 are so arranged that initial contact takes place in the region of the hinge.

It will be understood that the different embodiments illustrated can be combined with one another, e.g., the embodiment of FIG. 4d can be used in conjunction with the embodiment of FIG. 3c.

An effect common to all of the embodiments described above is that the regions of the magnetized and magnetizable sheets corresponding to the area $F_2$ of greater magnetic force $P_2$ are attracted to one another before the remaining regions are attracted to each other. When the device containing the magnetized and magnetizable sheets is closed, the regions corresponding to the area $F_2$ are pressed together with greater force than the remaining regions which causes any air bubbles still present to be forced outwards. In this regard, the remaining regions are not drawn together simultaneously after the regions corresponding to the area $F_2$ have approached one another. Rather, adjacent portions of the remaining regions are attracted to each other consecutively. Thus, after the regions corresponding to the area $F_2$ have drawn together, there exists a new region, namely, the region adjacent that corresponding to the area $F_2$, having a greater magnetic force than any of the regions which have not yet been attracted to one another. Accordingly, the magnetized and magnetizable sheets approach each other gradually beginning from the regions corresponding to the area $F_2$ of greater magnetic force $P_2$ and thereby force all air out.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. An arrangement for gripping photosensitive material, particularly X-ray film, comprising:
    (a) an enclosure for accommodating the photosensitive material; and
    (b) a pair of relatively movable units in said enclosure for engaging opposite sides of the photosensitive material, each of said units having a magnetic element for attracting the other unit, and said units including cooperating first portions arranged to engage the photosensitive material with a first magnetic force of first magnitude, said units farther including cooperating second portions arranged to engage the photosensitive material with a second magnetic force of second magnitude larger than said first magnitude.

2. An arrangement as defined in claim 1, wherein said units are arranged to approach one another in such a manner that said second portions engage the photosensitive material no later than said first portions.

3. An arrangement as defined in claim 2, wherein said units are arranged to approach one another in such a manner that said second portions engage the photosensitive material prior to said first portions.

4. An arrangement as defined in claim 1, wherein at least one of said units comprises an intensifying element, said intensifying element being located on that side of the associated magnetic element which faces the other unit.

5. An arrangement as defined in claim 4, wherein said intensifying element is an intensifying screen.

6. An arrangement as defined in claim 1, wherein said magnetic elements are sheet-like.

7. An arrangement as defined in claim 1, wherein at least one of said units is flexible.

8. An arrangement as defined in claim 1, wherein the photosensitive material is to be exposed and the areas of said units approximate that area of the photosensitive material to be exposed.

9. An arrangement as defined in claim 8, wherein the photosensitive material is in the form of a sheet and the areas of said units approximate that of the sheet of photosensitive material.

10. An arrangement as defined in claim 1, said enclosure comprising a cassette.

11. An arrangement as defined in claim 1, wherein the second portion of one of said units generates a greater magnetic force than the associated first portion.

12. An arrangement for gripping X-ray film comprising a pair of relatively movable units for engaging opposite sides of the film, each of said units having a magnetic element for attracting the other unit, and said units including cooperating first portions arranged to engage the film with a first magnetic force of first magnitude, said units further including cooperating second portions arranged to engage the film with a second magnetic force of second magnitude larger than said first magnitude, and one of said magnetic elements comprising a permanent magnet.

13. An arrangement as defined in claim 12, wherein the other of said magnetic elements comprises a non-permanent magnet.

14. An arrangement for gripping X-ray film comprising a pair of relatively movable units for engaging opposite sides of the film, each of said units having a magnetic element for attracting the other unit, and said units including cooperating first portions arranged to engage the film with a first magnetic force of first magnitude, said units further including cooperating second portions arranged to engage the film with a second magnetic force of second magnitude larger than said first magnitude; and mechanical means which act to decrease the distance of separation of said second portions relative to that of said first portions.

15. An arrangement as defined in claim 14, wherein said mechanical means comprises a wedge-shaped element in one of said units.

16. An arrangement as defined in claim 14, wherein said mechanical means comprises an additional magnet located in the second portion of one of said units, said additional magnet being arranged on that side of the associated magnetic element which faces away from the other unit, and like poles of said additional magnet and the associated magnetic element being juxtaposed.

17. An arrangement as defined in claim 14, wherein said mechanical means comprises a block-like element in the second portion of one of said units, said block-like element being arranged on that side of the associated magnetic element which faces away from the other unit.

18. An arrangement as defined in claim 17, wherein said block-like element is resilient.

19. An arrangement as defined in claim 14, wherein at least one of said units is arcuate.

20. An arrangement as defined in claim 19, wherein one of said units has a cylindrical configuration and the other of said units has a spherical configuration.

21. An arrangement as defined in claim 19, wherein said one unit has a cylindrical configuration.

22. An arrangement as defined in claim 19, wherein said one unit has a spherical configuration.

23. An arrangement for gripping X-ray film comprising a pair of relatively movable units for engaging opposite sides of the film, each of said units having a magnetic element for attracting the other unit, and said units including cooperating first portions arranged to engage the film with a first magnetic force of first magnitude, said units further including cooperating second portions arranged to engage the film with a second magnetic force of second magnitude larger than said first magnitude, aand the second portion of one of said units generating a greater magnetic force than the associated first portion, a cover to block the magnetic lines of force being arranged in the second portion of said one unit and on that side of the associated magnetic element which faces away from the other unit.

24. An arrangement as defined in claim 23, wherein said cover is sheet-like and comprises a ferrite.

25. An arrangement for gripping X-ray film comprising a camera which accommodates the film; and a pair of relatively movable units for engaging opposite sides of the film accommodated by said camera, each of said units having a magnetic element for attracting the other unit, and said units including cooperating first portions arranged to engage the film with a first magnetic force of first magnitude, said units further including cooperating second portions arranged to engage the film with a second magnetic force of second magnitude larger than said first magnitude.

26. An arrangement for gripping X-ray film comprising a pair of relatively movable units for engaging opposite sides of the film, each of said units having a magnetic element for attracting the other unit, and said units including cooperating first portions arranged to engage the film with a first magnetic force of first magnitude, said units further including cooperating second portions arranged to engage the film with a second magnetic force of second magnitude magntidue larger than said first magnitude, and the second portion of one of said units generating a greater magnetic force than the associated first portion, the magnetic element of said one unit being thicker in the second portion than in the associated first portion.

27. An arrangement for gripping X-ray film comprising a pair of relatively movable units for engaging opposite sides of the film, each of said units having a magnetic element for attracting the other unit, and said units including cooperating first portions arranged to engage the film with a first magnetic force of first magnitude, said units further including cooperating second portions arranged to engage the film with a second magnetic force of second magnitude larger than said first magnitude, and the second portion of one of said units generating a greater magnetic force than the associated first portion, the magnetic element of said one unit having magnetic domains in the second portion which differ in size from the magnetic domains in the associated first portion.

28. An arrangement for gripping X-ray film comprising a pair of relatively movable units for engaging opposite sides of the film, each of said units having a magnetic element for attracting the other unit, and said units including cooperating first portions arranged to engage the film with a first magnetic force of first magnitude, said units further including cooperating second portions arranged to engage the film with a second magnetic force of second magnitude larger than said first magnitude, and the second portion of one of said units generating a greater magnetic force than the associated first portion, the magnetic element of said one unit being provided with openings in the first and second portions thereof and at least some of the openings in the second portion being smaller than those in the first portion.

29. An arrangement for gripping X-ray film comprising a pair of relatively movable units for engaging opposite sides of the film, each of said units having a magnetic element for attracting the other unit, and said units including cooperating first portions arranged to engage the film with a first magnetic force of first magnitude, said units further including cooperating second portions arranged to engage the film with a second magnetic force of second magnitude larger than said first magnitude, and the second portion of one of said units generating a greater magnetic force than the associated first portion, the magnetic element of said one unit being provided with openings in the first portion thereof but not in the second portion thereof.

30. An arrangement for gripping X-ray film comprising a pair of relatively movable units for engaging opposite sides of the film, each of said units having a magnetic element for attracting the other unit, and said units including cooperating first portions arranged to engage the film with a first magnetic force of first magnitude, said units further including cooperating second portions arranged to engage the film with a second magnetic force of second magnitude larger than said first magnitude, and mechanical and pneumatic means which act to decrease the distance of separation of said second portions relative to that of said first portions.

31. An arrangement for gripping X-ray film comprising a pair of relatively movable units for engaging opposite sides of the film, each of said units having a magnetic element for attracting the other unit, and said units including cooperating first portions arranged to engage the film with a first magnetic force of first magnitude, said units further including cooperating second portions arranged to engage the film with a second magnetic force of second magnitude larger than said first magnitude; and pneumatic means which act to decrease the distance of separation of said second portions relative to that of said first portions.

* * * * *